July 16, 1957 E. B. NEWTON ET AL 2,799,155
APPARATUS FOR DETERMINING ABRASION RESISTANCE
Filed May 28, 1954 4 Sheets-Sheet 1
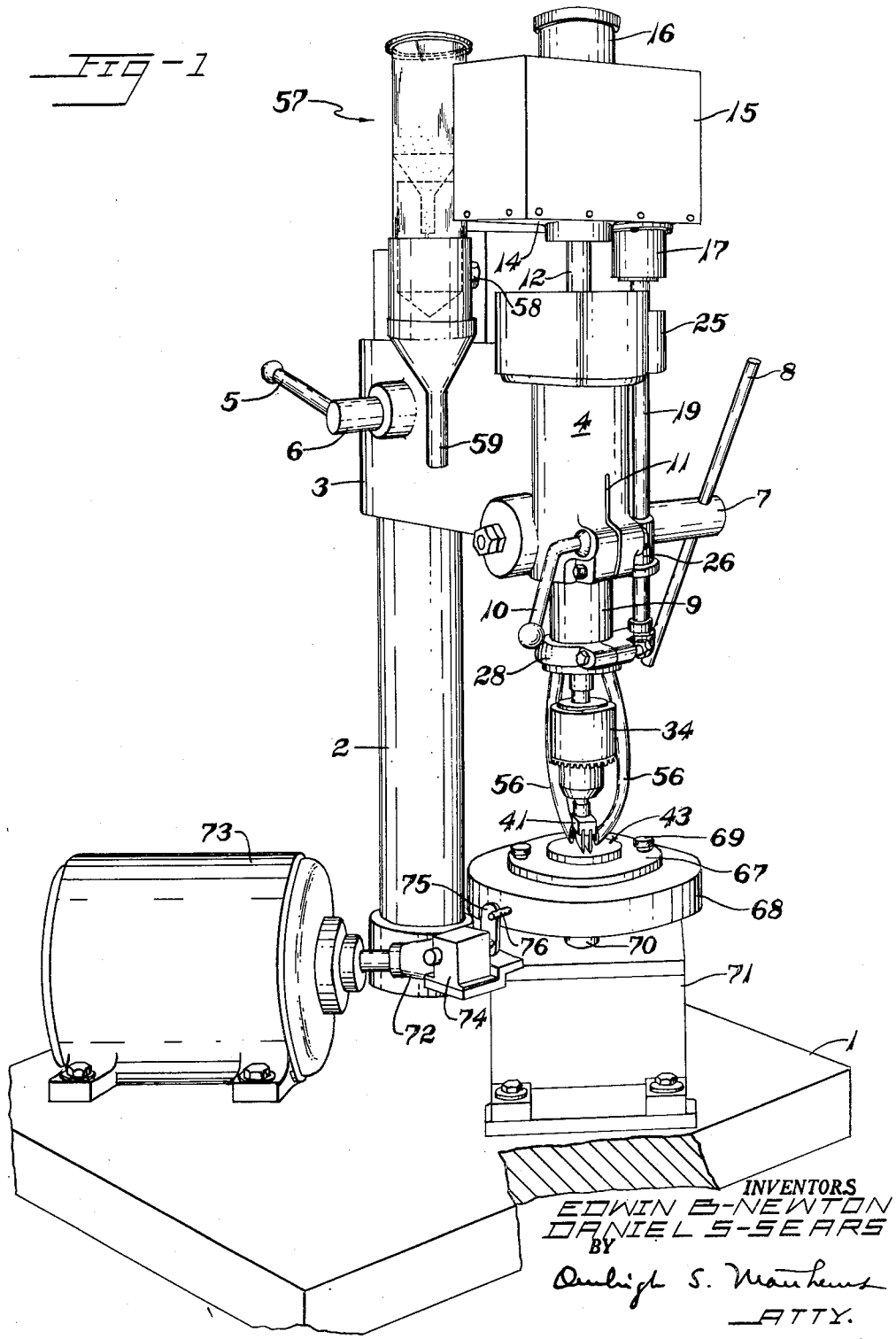
INVENTORS
EDWIN B. NEWTON
DANIEL S. SEARS
BY
Dunleigh S. Matthews
ATTY.

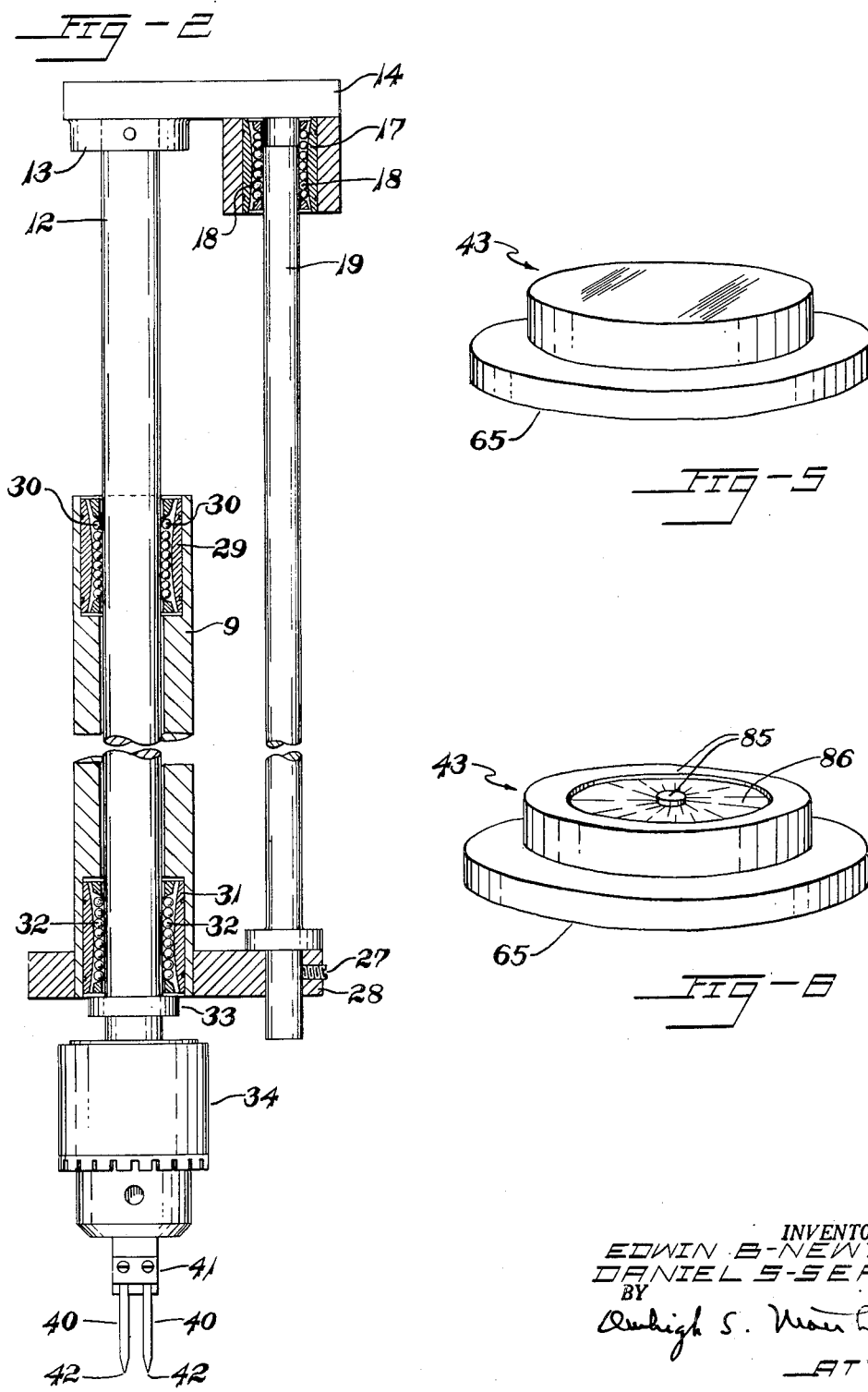

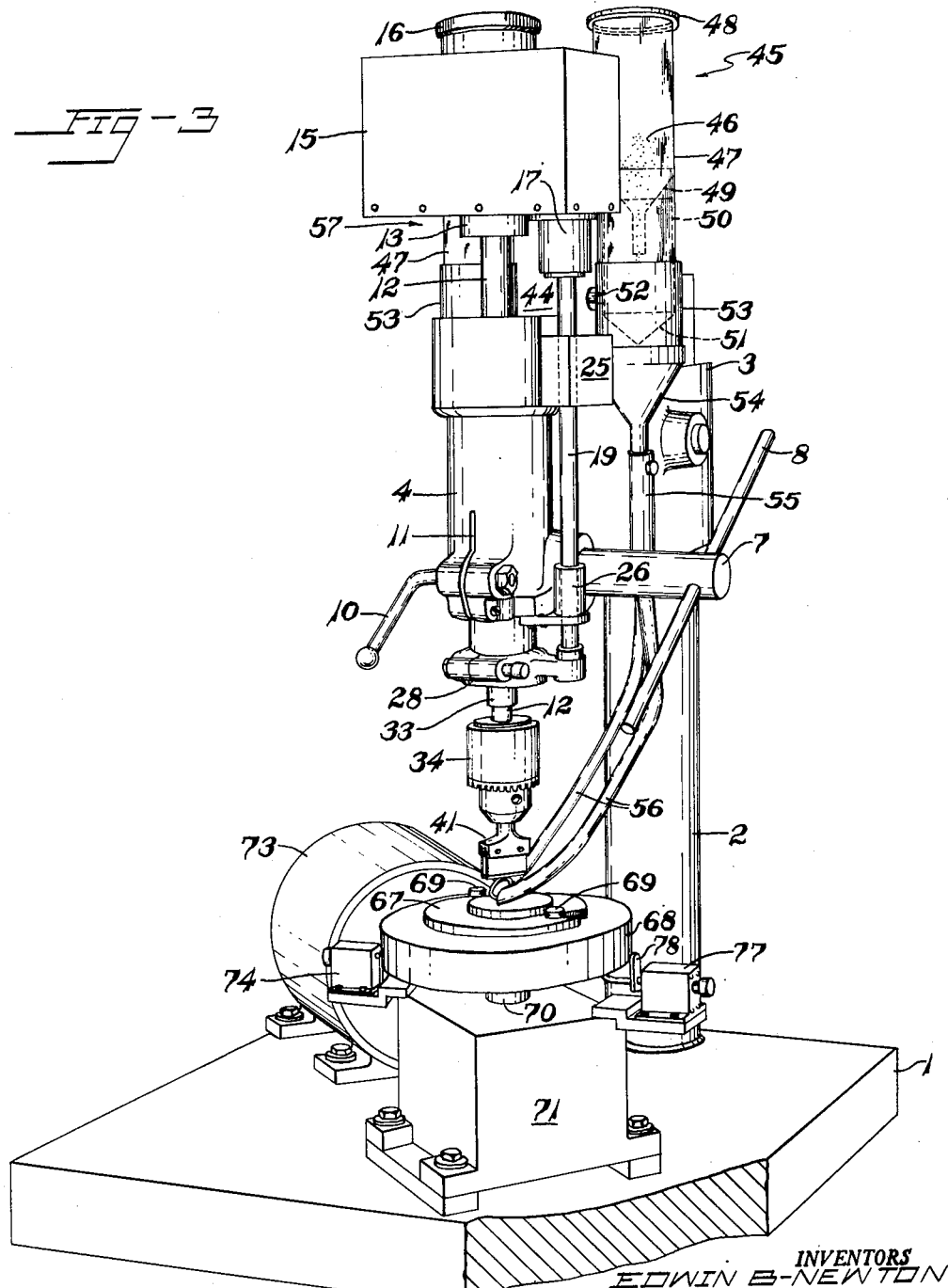

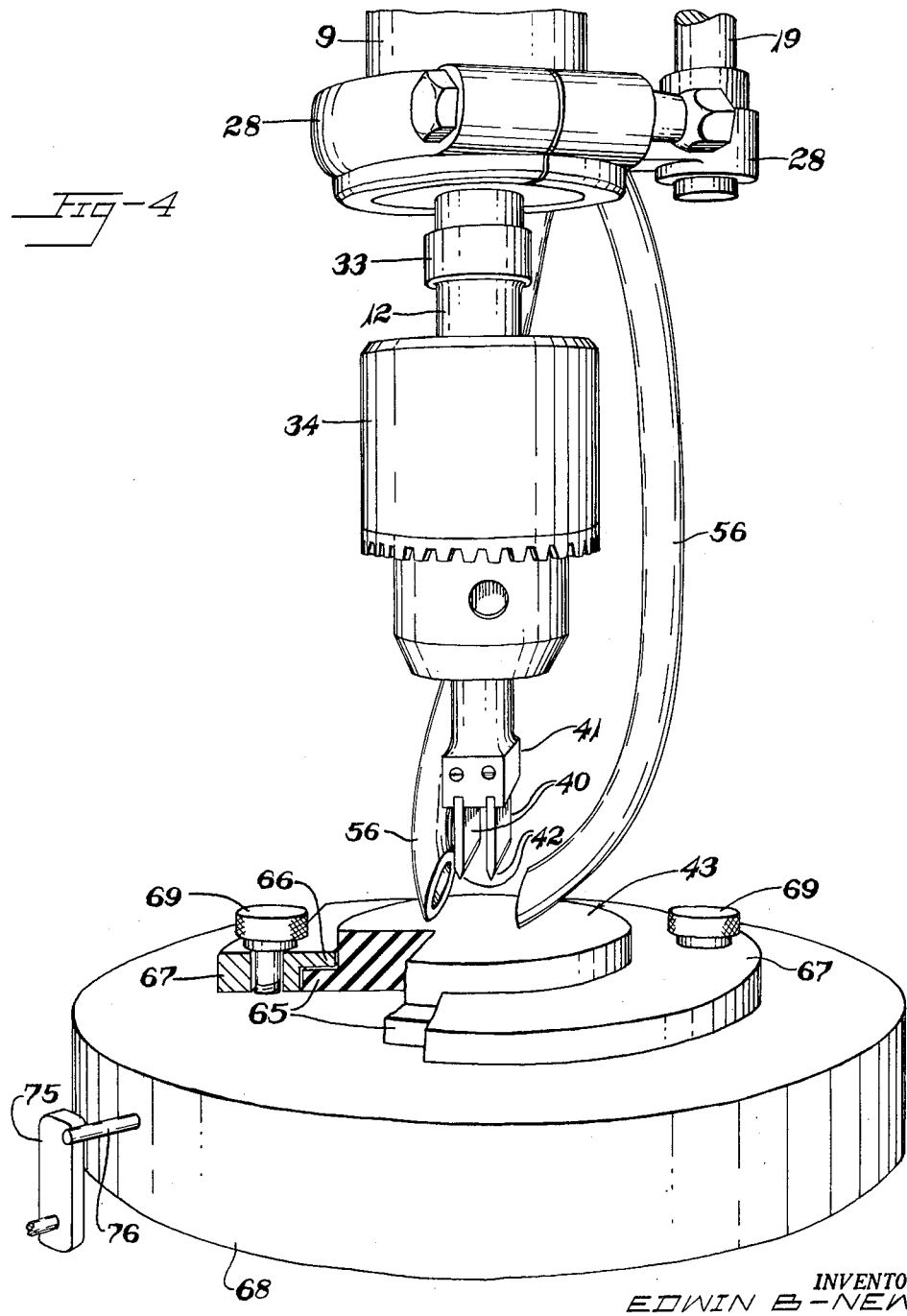

United States Patent Office 2,799,155
Patented July 16, 1957

2,799,155

APPARATUS FOR DETERMINING ABRASION RESISTANCE

Edwin B. Newton, Akron, Ohio, and Daniel S. Sears, Henrico County, Va., assignors to The B. F. Goodrich Company, New York, N. Y., a corporation of New York Application May 28, 1954, Serial No. 433,226

12 Claims. (Cl. 73—7)

The present invention relates to an apparatus or machine for determining the abrasion or wear resistance of rubbery compounds. More particularly, it relates to an apparatus for determining the abrasion resistance of rubber tire tread compounds.

Abrasion machines are generally used in the rubber industry to obtain a measure of the abrasion or wear resistance of various formulations of rubbery materials before they are used in tires and other rubbery articles that must withstand wear. From years of experience, the industry has learned that a rubbery composition which exhibits poor abrasion resistance on such machines will almost always exhibit poor abrasion resistance under conditions of actual use, for example, after a road test when such compound is to be used in the tread portion of a tire. However, the reverse situation is not generally true. Compounds which exhibit good abrasion resistance on such machines do not always show good results as to abrasion resistance when built into a tire and given a good test. Hence, while such machines do perform the function of screening many materials and eliminating them as to abrasion resistance, there is often poor correlation between the tests showing favorable abrasion resistance on such machines and the results actually obtained on road tests. Due to this state of affairs rubbery materials or compositions for use in tire treads must always be tested on the road before they are deemed commercially acceptable. Moreover, even though presently available abrasion machines do eliminate a number of unsuitable compounds, a large number of the supposedly useful compounds are still built into tires which do not exhibit the required abrasion resistance. The time and expense of building such tires and the time and expense involved in road tests are considerable and tend to increase the overall costs of tires as well as to delay the evaluation of new compounds.

Accordingly, it is a primary object of the present invention to provide an apparatus which measures the abrasion resistance of a rubbery material more effectively than presently available machines.

It is another object of the present invention to provide an apparatus for measuring the abrasion resistance of rubbery materials wherein the results obtained very closely correlate with actual road tests.

Still another object is to provide an abrasion resistance testing machine which markedly reduces the number of subsequent road tests.

These and other objects and advantages of the present invention will become more apparent to those skilled in the art from the following detailed description, example, and drawings, wherein, Fig. 1 is a perspective view of the apparatus of the present invention;

Fig. 2 is a view partly in elevation and partly in vertical section of a portion of the apparatus of Fig. 1 showing in detail the method for restraining rotary movement of the abrading means;

Fig. 3 is another perspective view of the apparatus of the present invention;

Fig. 4 is an enlarged perspective view of a portion of the apparatus of Fig. 1 showing in detail the abrading and sample holding elements of the apparatus;

Fig. 5 is a perspective view of a sample of rubbery material to be abraded; and

Fig. 6 is a perspective view of a sample of rubbery material after being abraded.

It has now been discovered according to the present invention that by moving a sample of rubbery material relative to a sharp-edged abrading device under an adjustable load in the presence of scouring material, it is possible to obtain abrasion resistance data which correlate with the data obtained on subsequent road tests. By use of the apparatus of the present invention the number of road tests can be markedly reduced and the consequent building and handling of many tires required for such tests. Hence, time and effort in building a great many test tires as well as delay in obtaining results of road tests are eliminated.

As shown in the drawing, Figs. 1 to 4, base 1 supports column 2 on which is mounted arm 3 containing conventional drill press hollow head 4 for supporting the adjustable abrading means of the apparatus. The arm and its head may be integral. The back of the arm is split and, by means of lever 5 in bearing 6, the lever can be turned against a nut to tighten the arm on the column and thereby provide adjustment of the height of the arm. Shaft 7 mounted in the arm contains lever 8 for turning it and a gear (not shown) designed to cooperate with a rack (not shown) on the side of tube 9 for raising or lowering the tube as desired. Lever 10 mounted in head 4 can be turned to tighten the head split at 11 against the tube to secure the tube in place. Shaft 12 can vertically reciprocate in the tube and carries on its upper end collar 13 and is secured to plate 14 carrying 4-sided member 15 which forms with the plate a container open at the top and designed to carry a predetermined weight such as mercury in bottle 16. At one end of the plate parallel to the shaft is secured ball bearing 17 having vertical raceways 18—18 and in which the top end of guide rod 19 may freely ride. Rod 19 also passes through bearings 25 and 26 attached to the head in order to prevent it from twisting and its lower end is secured by means of set screw 27 to collar 28 secured to the lower end of tube 9. Ball bearing 29 having vertical raceways 30—30 and ball bearings 31 having vertical raceways 32—32 are secured in the ends of tube 9 about shaft 12 to reduce friction. Collar or stop 33 is provided on shaft 12 to limit its upward movement while the lower end of the shaft carries chuck 34, such as a Jacobs chuck, for holding the abrading means assembly. It, thus, is seen that vertical upward movement of shaft 12 is limited by the distance collar 33 can move before it is stopped by the bottom surface of bearing 31 while downward movement is limited by the distance plate 14 can move before it touches the top of rod 19. The upward movement will never be sufficient to cause the bearing to become free of the end of guide rod 19 due to the limitation in movement afforded by collar 33. The bearings reduce friction of the rod and shaft as it reciprocates slightly. Accordingly, shaft 12 can reciprocate vertically somewhat but is restrained against rotary movement.

Abrading knives 40—40 in holder 41 are mounted in the chuck and have their cutting edges 42—42 perpendicular to the surface of the work. The knife or knives are mounted in the holder so that their center is offset from the center of the chuck or shaft 12 and will not coincide with the center of the sample 43 being abraded and their length will be such as to abrade only a portion of the sample treated. While the center of the blade can coincide with the center of the sample, it is preferred to offset the blade since the best abrading action is thereby obtained and since the center of the sample will not be abraded where it coincides with the blade center. Moreover, it is preferred to abrade only a portion of the surface area of the sample since better results are obtained. While two knives are generally used, it is apparent that one knife or more than two knives can likewise be used with equal success. The cutting edge of the knife is preferably V-shaped with an included angle of 60 degrees. However, cutting edges of as low as 30 and up to 90 degrees can be used as well as knives having only one side beveled. Blades which are as thin as razor blades are too sharp to properly abrade whereas blades with cutting edges greater than 90 degrees tend to slide over the surface of the sample. The thickness of the cutting edge can range from about 8 to 20 microns. Blades of the knives are preferably of tungsten carbide composition; for example, a cemented tungsten carbide composition which contains WC—51%, Co—7%, TaC—10% and TiC—32% has proved eminently satisfactory although blades of other tungsten carbide compositions, corundum (sapphire), diamond and various alloys and the like can also be used and which have high hardness without too much brittleness.

Secured to member 3 behind head 4 is electrical vibrator 44 and hopper 45 containing scouring material 46. The scouring material in upper cylindrical portion 47 containing cap 48 of the hopper falls through funnel 49 into cylinder 50 containing cone-shaped sieve 51 on its lower end. Rod 52 from the vibrator passes through sleeve 53 connecting the upper cylindrical portion 47 with funnel 54 to actuate cylinder 50 and its sieve to shake the scouring material into tube 55 and into tube extensions 56—56 to deposit the scouring material on the surface of the sample adjacent the knife blade. A second hopper 57 may be positioned on the opposite side of member 3 and operated by another vibrating rod 58 from the vibrator to cause the scouring material to be delivered through tube 59 (broken away) to the surface of the sample. A source of electrical power (not shown) and switches (not shown) are connected to the vibrator for actuating and controlling it.

The scouring material should be finely divided, i. e. having a particle size of about 5–600 m$\mu$, and be free of dirt, grit and the like which tend to damage the blades. It also should not be a soft and plate-like material such as talc, clay or carbon black which tends to adhere to the surface of the sample or cause the knife blade or blades to skid or slide over the surface of the sample without obtaining the proper abrading action. Materials such as fibrous or spherical silicon monoxide "monox," $(Si)_x.(SiO_2)_y$ where $x$ and $y$ are whole numbers, arc silica, fume silica, polymeric silicon oxyimide, and the like have been found eminently suitable for the purposes of the present invention since they have low bulk density and tend to roll away or remove the small particles of rubber abraded from the sample by the knife without sticking to the knife or causing it to slide and without chipping or breaking the knife itself. The "monox" or silica may or may not be coated with such materials as trimethylol trimethyl pentane, pentaerythritol monooleate and the like and mixtures thereof in minor amounts, usually about 10% on the weight of the pigment. Methods for making "monox" and the like are described in copending applications of Daniel S. Sears, entitled "Method of Making Pigment" and "Pigment and Process of Making the Same," filed of even date, Serial Nos. 433,020 and 433,099, respectively, copending application of Edwin B. Newton and Daniel S. Sears, entitled "Improving Color of Pigments," filed of even date, Serial No. 433,289, and copending application of Edwin B. Newton and Daniel S. Sears, entitled "Reinforcement of Rubber," S. N. No. 433,291, filed of even date. Methods of making "monox" are also disclosed by Potter in U. S. Patents 875,286, 875,674, 875,675, 886,637, 908,131 and 1,104,384, by Potter in "Transactions of the American Electrochemical Society," vol. XII, 1907, pages 191–228, and by Tone in U. S. Patent 993,913. The spherical form of silicon monoxide having an average particle size of from about 5–200 m$\mu$ is preferred.

The sample of rubber stock to be tested is preferably round and contains flange 65 on its lower surface adapted to slide under shoulder 66 of circular clamping plate 67 on turntable 68. Bolts 69—69 passing through the plate and secured to the turntable can be tightened to press the heads of the bolts against the plate to firmly secure it and the sample to the turntable.

The turntable is mounted on shaft 70 of gear reducer 71 having a 6.5 to 1 ratio, although obviously other ratios can be used, which is driven through flexible coupling 72 by means of reversible electric motor 73. The electric motor is connected to a source of electric power (not shown) and to switches (not shown) for operating and controlling it. In place of a reversible electric motor, an electric motor turning in only one direction and connected to pulleys or to a clutch and transmission can be used to reverse the direction of the turntable. Counter 74 such as Veeder-Root ratchet counter is attached to one side of the gear reducer and its arm 75 is actuated by pin 76 mounted on the rim of the turntable. The counter thus records the number of revolutions in one direction. Another counter 77 for recording the number of revolutions in the reverse direction is mounted on the opposite side of the gear reducer and contains arm 78 for actuation by the pin.

It will be understood that various modifications can be made in the apparatus with achievement of substantially the same results. For example, the container may be filled with lead shot and provided with a valve to dump the contents. A feed hopper to fill the container with the amount of material desired to give the required weight can be positioned above the container and attached to the frame so that it will not bear on the shaft. The speed of rotation of the turntable and the direction of rotation can be varied or changed as desired depending on the conditions of the test. However, it is best to standardize conditions so as to work with as few variables as possible. Moreover, the amount of monox deposited on the surface of the sample can also be varied.

The method of calibration of the apparatus is critical and employs a series of widely abrasion resistant standards rather than a single standard. Five rubber stocks whose performance as tire treads on a standardized road test is well known are used for calibration. The stocks and their relative road ratings are as follows:

| Stock | Rating |
| --- | --- |
| Natural rubber+EPC Black | 100 |
| Hot GR-S rubber+EPC Black | 90 |
| Cold GR-S rubber+EPC Black | 110 |
| Cold GR-S rubber+HAF Black | 125 |
| Cold GR-S rubber+SAF Black | 150 |

In use, the series of standards is brought into proper relative rating by changing the dead weight loading on the knives until some single weight is found which causes the five stocks to fall into the relative rating shown by the above road tests. When this occurs, the machine is regarded as calibrated and ready for testing unknown samples. By using a series of controls, the machine, thus, is calibrated against a line plotted from the controls representative of road test data rather than against a point or single control and is not limited as to polymer base or reinforcing pigment.

For comparison the above standard stocks were run on conventional abrasion machines according to the manufacturer's directions and the results are shown below:

| Stock | Rating on Machine "A" | Rating on Machine "B" |
|---|---|---|
| Natural Rubber+EPC Black | 100 | 100 |
| Hot GRS Rubber+EPC Black | 135 | 155 |
| Cold GRS Rubber+EPC Black | 133 | 329 |
| Cold GRS Rubber+HAF Black | 159 | 425 |
| Cold GRS Rubber+SAF Black | 218 | 510 |

According to the data from these machines cold GRS rubber reinforced with SAF carbon black is 100 or 400% better than natural rubber reinforced with EPC black whereas actual road tests show that the cold GRS rubber plus SAF black is only 50% better than the natural rubber stock. On the other hand, road tests show that a standard hot GRS rubber-EPC black stock is only 90% as good as a natural rubber-EPC stock while the above data would indicate that the hot GRS-EPC stock is 35 or 55% better than a natural rubber stock. Note that machine "A" indicated that cold GRS-EPC stock was not as good as hot GRS-EPC stock while machine "B" showed that cold GRS-EPC stock was about 100% better than hot GRS-EPC stock. On the other hand, road tests show that cold GRS-EPC stock was only 20% better than hot GRS-EPC stock. Hence, it is apparent that the prior art machines and methods do not provide data which can be said to correlate with the results to be obtained on actual road tests. On the other hand, the machine and method of the present invention afford a means of measuring the abrasion resistance of rubbery compounds which correlates with actual road tests.

The following example will serve to illustrate the invention with more particularity to those skilled in the art:

A sample of a natural rubber composition containing the usual compounding agents and the like was vulcanized into a test button about 1½" diameter, ¼" thick and having a flanged base. The surface of the sample was buffed to remove flash and to make it clean and smooth, see Fig. 5, and weighed. It weighed about 15 grams, and was then placed in the clamp on the turntable of the abrasion resistance testing machine and the clamp tightened. See Figs. 1 to 4. The machine had previously been calibrated. The abrading means on the shaft comprised two parallel tungsten carbide composition blades each having an edge comprising a 60° included angle and were about ⅝" long and about 1 cm. apart. The shaft was unlocked and lowered so that the blades rested freely on the surface of the sample. The center of the sample was at the midpoint between the centers of the blades. The dead weight loading on the shaft and consequently on the blades was 4,500 grams of mercury placed in the container. Monox was then sifted down on the button through the tubes to completely cover the surface. Next the turntable was rotated at a speed of 60 R.P.M. 20 times clockwise, then 20 times counterclockwise and the actions repeated to give a total of 80 revolutions. At the end of the run, the surface of the sample was cleaned of monox by running a vacuum hose over it. The appearance of the sample is shown in Fig. 6 where the unabraded areas are shown at 85—85 and the abraded area which appears wrinkled is shown at 86. Weighing of the sample followed and the volume loss was computed by dividing the weight loss by the specific gravity of the sample. The volume loss of the sample was .026 cc. as compared to a standard natural rubber-EPC stock exhibiting a volume loss of .025 cc. It lost more rubber and therefore had an index of 96 (.025/.026) as compared to a natural rubber-EPC stock exhibiting an index of 100. When the same sample was built into a tire as the tread portion and given a road test, it also exhibited an index of about 96. After about 30 samples are run, the machine is rechecked for calibration.

Additional experimental rubber tread stocks were tested on the machine of the present invention and compared against results from actual road tests in which the stock was used as a tire tread. The results of the tests are shown in the table below:

| Experimental Stock Tested | Machine Index on Sample | Road Index on Tire |
|---|---|---|
| Cold GRS base | 97 | 93 |
| Cold GRS base | 90 | 91 |
| Cold GRS base+oil | 97 | 102 |
| Cold GRS base+more oil | 90 | 91 |
| Cold GRS Latex-Black coprecipitate | 98 | 98 |
| Cold GRS base | 101 | 103 |
| Cold GRS (continuous polymerization) base | 104 | 91 |
| Cold GRS (continuous polymerization) base+rosin base | 94 | 92 |
| Neoprene+Nat. Rubber base | 87 | 90 |
| Natural Rubber base | 84 | 90 |
| Butyl base | 58 | 58 |
| Butyl base | 63 | 59 |
| Cold GRS-HAF base | 116 | 118 |

In summary, the present invention discloses a novel testing machine or apparatus which measures the abrasion resistance of a rubbery sample not limited as to polymer type base and will serve to give values which correlate closely with those obtainable on standardized tests or under conditions of actual use. The apparatus comprises means to rotate the sample against a loaded, nonrotatable, vertically movable, knife edge in the presence of a scouring material which serves to remove the particles of rubber as they are abraded without injuring the abrading means.

What is claimed is:

1. Apparatus useful for measuring the abrasion resistance of rubbery materials comprising, in combination, means for holding and for rotating substantially horizontally a sample of material including means to reverse the direction of rotation of said holding and rotating means, non-rotary hard sharp abrading means adapted to bear against and to abrade at least a portion of the surface to be abraded of said sample, said abrading means comprising at least one plate-like element presenting a tapered thin cutting edge portion of greater length than its maximum thickness, means to adjustably hold and to reciprocate said abrading means perpendicular to the surface of said sample and essentially parallel to the axis of rotation of said sample holding and rotating means including means to permit limited free perpendicular movement of said abrading means and containing adjustable pressure means to exert a predetermined constant load on said abrading means, and means to apply a predetermined amount of particulate scouring material to the surface of said sample and adjacent to said abrading means.

2. Apparatus according to claim 1 wherein said abrading means comprises a pair of parallel knives.

3. Apparatus according to claim 2 wherein said knives include cutting edges of diamond.

4. Apparatus according to claim 2 wherein said knives include cutting edges of sapphire.

5. Apparatus according to claim 2 wherein said knives include cutting edges comprising a tungsten carbide composition.

6. Apparatus according to claim 5 wherein each knife has a V-shaped cutting edge having an included angle of from about 30 to 90° and of a thickness of from about 8 to 20 microns.

7. Apparatus according to claim 6 wherein the midpoint between the center of the knives coincides with the axis of rotation of said sample holder.

8. Apparatus according to claim 1, wherein said abrading means comprises a knife offset from the center of said sample.

9. Apparatus according to claim 1 wherein a layer of a particulate scouring material selected from the group consisting of silicon monoxide, arc silica, fume silica and polymeric silicon oxyimide is disposed on the exposed surface of a sample of rubbery material in said sample holding and rotating means and adjacent said abrading means.

10. Apparatus according to claim 9 wherein a layer of particulate scouring material comprising silicon monoxide is disposed on the exposed surface of a sample of rubbery material in said sample holding and rotating means and adjacent said abrading means.

11. Apparatus useful for measuring the abrasion resistance of rubbery materials comprising, in combination, means for holding and for rotating substantially horizontally a sample of rubbery material including means to reverse the direction of rotation and including means to record the number of revolutions of said holding and rotating means, non-rotary hard sharp abrading means adapted to bear against and to abrade at least a portion of the surface to be abraded of said sample and comprising at least one plate-like element presenting a tapered thin cutting edge portion of greater length than its maximum thickness, said cutting edge portion having a thickness of from about 8 to 20 microns, having an included angle of about 60 degrees and comprising a tungsten carbide composition, means to adjustably hold and to reciprocate said abrading means perpendicular to the surface of said sample and parallel to the axis of said sample holding and rotating means including means to permit limited free perpendicular movement of said abrading means, adjustable pressure means to exert a predetermined constant load on said sample of rubbery material by said abrading means, and means to hold and to apply a predetermined amount of particulate scouring material to the surface of said sample and adjacent to said abrading means, said last named means for holding and applying said material comprising a container and a delivery conduit for said particulate scouring material including means to vibrate said container to deliver said material to said conduit.

12. Apparatus useful for measuring the abrasion resistance of resilient materials comprising, in combination, means for holding and rotating a sample of resilient material, non-rotary hard sharp abrading means adapted to bear against and to abrade the surface of said sample, said abrading means presenting a tapered thin cutting edge portion of greater length than its maximum thickness, means to hold and to yieldably urge said abrading means toward said sample rotating means to permit said cutting edge portion to contact the adjacent surface of a sample on the sample holding and rotating means in a direction substantially perpendicular to the surface of said sample, and pressure means to continuously apply a predetemined load on said abrading means to cause said cutting portion to press against the surface of said sample.

References Cited in the file of this patent
UNITED STATES PATENTS

| | | |
|---|---|---|
| 1,534,015 | Swenson | Apr. 14, 1925 |
| 2,338,537 | Podesta | Jan. 4, 1944 |
| 2,584,156 | Packer | Feb. 5, 1952 |
| 2,620,654 | Campbell | Dec. 9, 1952 |
| 2,718,779 | McLean | Sept. 27, 1955 |

OTHER REFERENCES

Bureau of Standards, Research Paper RP 612 (1933), pp. 635, 636, 637 and Fig. 1.